July 31, 1956

C. P. KRUPP ET AL
METHOD OF MANUFACTURING CONTINUOUS
TUBING AND APPARATUS THEREFOR 2,756,458

Filed Oct. 3, 1952

Inventors
Carroll P. Krupp
Stephen C. Sabo
By Dwight L. Moody
Atty

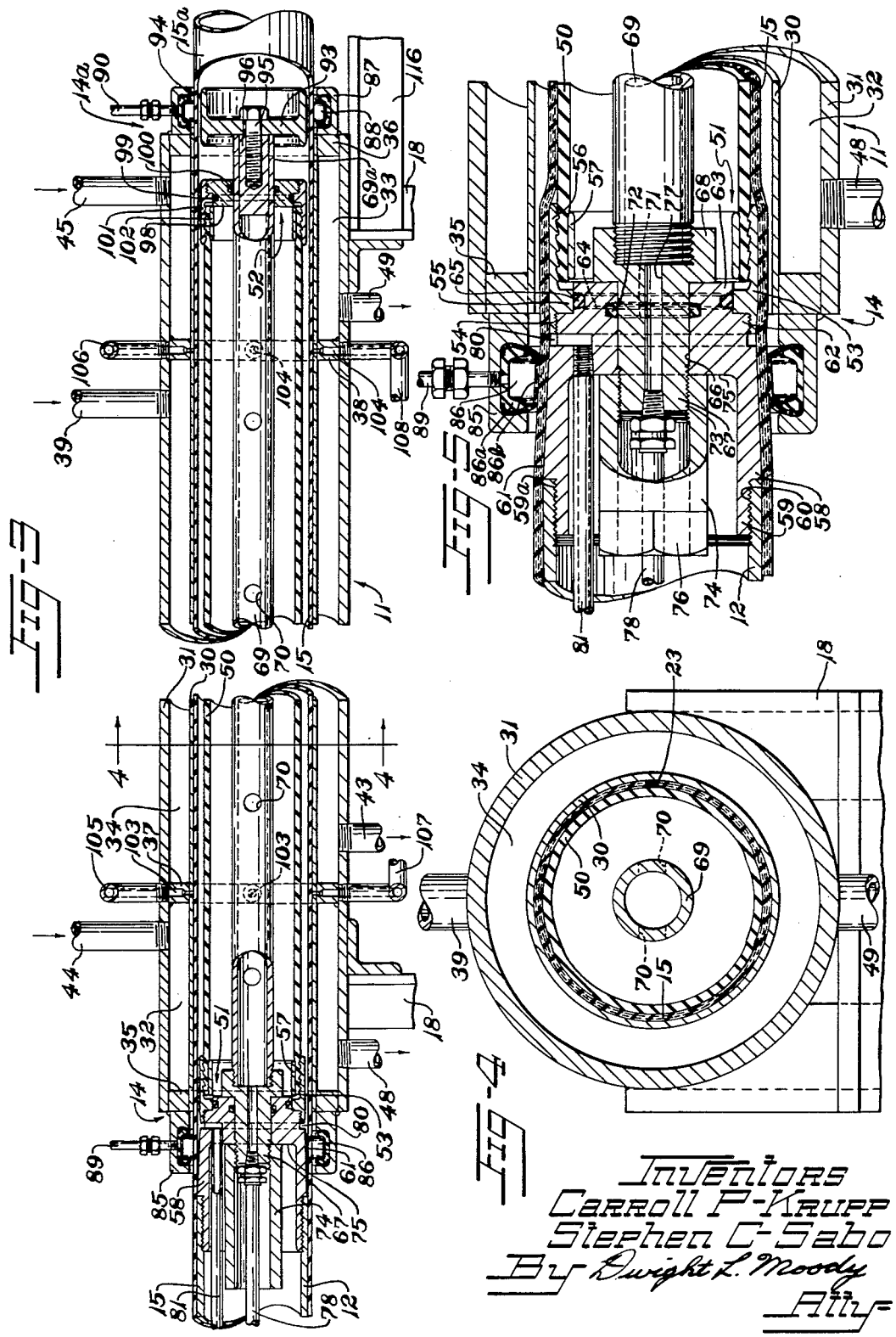

United States Patent Office 2,756,458
Patented July 31, 1956

---

2,756,458

METHOD OF MANUFACTURING CONTINUOUS TUBING AND APPARATUS THEREFOR

Carroll P. Krupp, Cuyahoga Falls, and Stephen C. Sabo, Akron, Ohio, assignors to The B. F. Goodrich Company, New York, N. Y., a corporation of New York Application October 3, 1952, Serial No. 313,008

8 Claims. (Cl. 18—6)

---

The invention relates to methods of and apparatus for making and curing a continuous length of tubing or hose of vulcanizable rubbery material, especially tubing or hose of thin-walled lightweight construction.

Objects of the invention are to provide an improved method of and apparatus for manufacturing a continuous length of tubing or hose including curing as by vulcanization under heat and pressure, successive portions or determinate lengths of the hose in a progressive and step-by-step manner; to provide for making successive interconnected determinate lengths of uncured vulcanizable tubing or hose at a forming station of the apparatus together with advancing such determinate lengths of uncured vulcanizable tubing or hose from the forming station to and in a step-by-step manner through a vulcanizing station and chamber of the apparatus so as to cure the tubing or hose during its intervals of rest within the vulcanizing chamber thereby producing a continuous length of vulcanized tubing or hose; to provide for forming one or more continuous strips of uncured vulcanizable sheet material into tubing of determinate length and in continuation of a preceding determinate length of tubing while curing such preceding determinate length of tubing in the vulcanizing chamber; and to provide for simplicity of construction, convenience and low cost of manufacture, and for effectiveness of operation.

Other objects are to provide for positively, inflatably and uniformly applying mechanical force to the wall of the determinate length of tubing to urge such wall into intimate heat-transferring contact with the adjacent wall of the vulcanizing chamber while heating the wall of the chamber to the temperature required for vulcanizing the rubbery material of the tubing; to provide for avoiding the presence of fluid between the wall of the tubing and the wall of the vulcanizing chamber immediately before and during the curing period to facilitate the intimately contacting heat-transferring relationship of both such walls; to provide for introducing fluid under pressure between such walls after the curing period to facilitate the withdrawal of the determinate length of vulcanized tubing from within the chamber; to provide for continuously cooling one or both end portions of the determinate length of tubing in the vulcanizing chamber, while initially heating and subsequently cooling the tubing intermediate such end portions for effecting vulcanization of the tubing within the chamber; to provide for sealing temporarily the ends of the determinate length of tubing within the vulcanizing chamber and also the ends of the chamber itself; and to provide for avoidance of blistering of the tubing and for preventing the sticking and adhesion of the tubing to adjacent parts of the vulcanizing chamber assembly so as to facilitate withdrawing the determinate length of cured tubing from the chamber, while advancing the next succeeding determinate length of uncured tubing into the chamber.

These and other objects and advantages of the invention will be apparent from the following description.

In the accompanying drawings which form a part of this specification and in which like numerals are employed throughout to designate like parts, Figs. 1a and 1b are side elevational views of an apparatus for forming and vulcanizing a continuous length of tubing, Fig. 1a showing the tube-forming station and Fig. 1b showing the vulcanizing station of the apparatus.

Fig. 3 is a longitudinal cross-sectional view of the vulcanizing chamber assembly of the apparatus before the uncured tubing is inflatably pressed against the wall of the vulcanizing chamber, parts being broken away.

Fig. 4 is a cross-sectional view taken along line 4—4 of Fig. 3 but showing the tubing inflatably pressed into intimate heat-transferring contact against the wall of the vulcanizing chamber at its curing zone, parts being broken away.

Fig. 5 is a longitudinal cross-sectional view in an enlarged scale of the junction of the delivery end of the tube-forming station with the entrant end of the vulcanizing station and the chamber assembly and showing the tubing inflatably moved way from the wall of the vulcanizing chamber, parts being broken away.

Figure 1A:
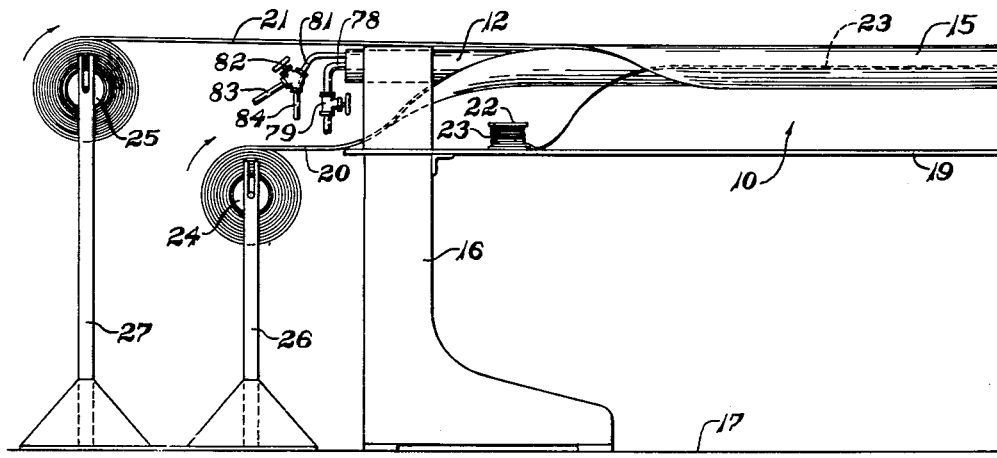

The illustrative apparatus shown in the drawings and constructed in accordance with and embodying the invention, is suitable for performing the method steps of the invention and is adapted to make continuous tubing or hose of vulcanizable rubbery material having a plurality of determinate lengths. The invention produces a long continuous length of tubing or hose made preferably by forming progressively one or more continuous flat strips of uncured vulcanizable rubbery sheet material into successive determinate lengths of uncured tubing or hose at the tube-forming station of the apparatus shown in Fig. 1a, and by curing progressively and in a step-by-step manner the determinate lengths of uncured tubing or hose at the vulcanizing station shown in Fig. 1b. The determinate lengths of uncured formed tubing are drawn or advanced from the tube-forming station to the vulcanizing station and passed directly into the entrant end 14 of and through a tubular vulcanizing chamber assembly 13 by a step-by-step axial sliding movement and are mechanically pressed against the heated wall of the assembly 13, so that the vulcanization of each determinate length 15 of uncured formed tubing takes place during its interval of rest within the vulcanizing chamber assembly, whereby the desired continuous length of vulcanized tubing is obtained at the delivery end 14a of the chamber.

The vulcanizable rubbery material comprising the continuous annular wall of the tubing may be natural or synthetic rubber, or both, or rubber-like material or synthetic material having substantially similar chemical composition or physical properties to natural rubber and to equivalents therefor, and capable of undergoing, under appropriate influences such as heat, pressure and the action of a chemical substance, a change from an essentially plastic flowable condition to a relatively firmer or harder, more elastic and resilient condition. Good results are provided by the illustrative apparatus when the continuous length of tubing is formed from one or more continuous flat strips 20, 21 of reinforced vulcanizable rubbery composition, although not necessarily limited thereto, each strip desirably comprising a thin uniform layer or coating of rubber-like copolymer of butadiene and acrylonitrile applied to both faces of square-woven textile fabric of rayon, nylon, cotton or other suitable filamentary material, which arrangement is resistant to aging, abrasion, burst and to material such as gasoline, oil and other liquid or gaseous fuels. Preferably, the rubbery composition is such that it will accommodate two or three full cures before reverting to a tacky condition or before becoming brittle, so as to permit some overcure at each end of a determinate length of tubing.

Figure 1B:
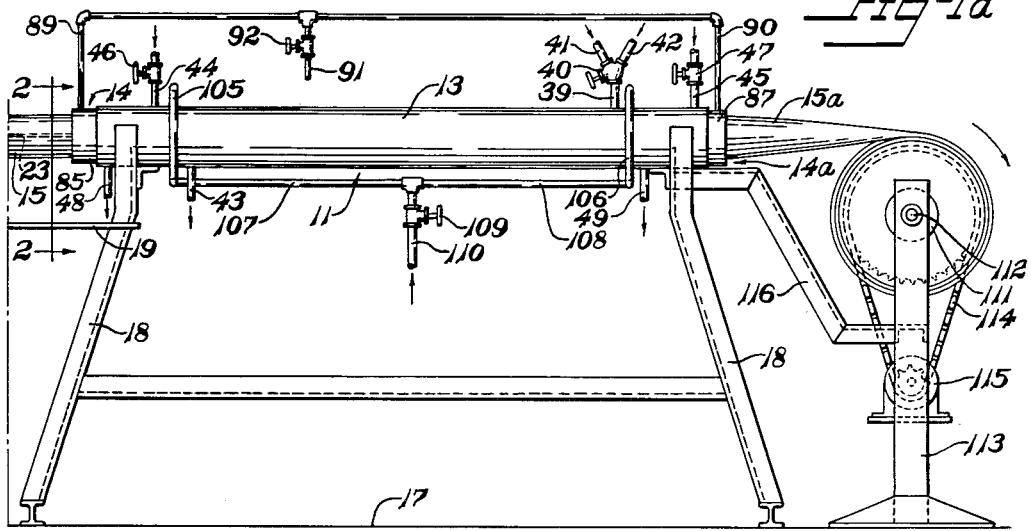
Figure 2:
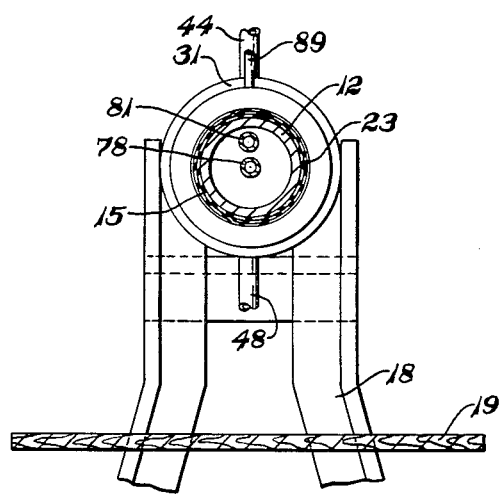
Fig. 2 is a cross-sectional view taken along line 2—2 of Fig. 1b looking toward the entrant end of a vulcanizing chamber assembly, parts being broken away.

The apparatus includes tubing or hose-forming means 10 in cooperative association with tubing or hose-vulcanizing means 11 as shown in Figs. 1a and 1b. The hose-forming means 10 comprises an elongated tubular mandrel 12 disposed horizontally in axial alignment with a horizontally disposed tubular vulcanizing chamber assembly 13 and connected directly to the entrant end 14 of the assembly 13. The tubular mandrel 12 has sufficient length to accommodate forming or building thereon as by manual operations, a determinate length of tubing or hose 15 of uncured vulcanizable rubbery material. The tubular mandrel 12 of stiff metal tubing such, for example, as stainless steel or aluminum alloy seamless tubing, has a smooth continuous cylindrical outer surface having a substantially uniform diameter corresponding approximately to the inside diameter of the tubing or hose to be manufactured.

The horizontal tubular mandrel 12 is supported adjacent its open end by a suitable vertical pedestal 16 secured to a supporting surface or floor 17. The tubular mandrel 12 is carried at its delivery end by the tubular vulcanizing chamber assembly 13 mounted horizontally upon a suitable girder framework 18 attached to the floor 17.

A work-support shelf 19 of wood or other suitable material is mounted fixedly beneath and spaced from the mandrel 12 so as to extend parallel thereto from the pedestal 16 to the framework 18, and functions to support temporarily one or more continuous flat strips or bands 20, 21 of suitable reinforced vulcanizable rubbery composition during their assembly upon the mandrel to form a determinate length 15 of uncured tubing or hose. If desired, the shelf 19 may also support a spool or bobbin 22 of static-removing or ground wire 23 of suitable electrically conductive metal material which can be unwound from the spool and adhesively applied longitudinally between plies of the formed tubing or hose on the mandrel.

Since the particular continuous length of tubing or hose shown in the drawings has two plies one being formed by the uncured continuous flat strip 20 and the other by the uncured continuous flat strip 21, strips 20 and 21 may be wrapped upon suitable reels 24, 25 mounted detachably for rotation upon spaced-apart standards 26, 27 arranged at the pedestal end of the tubular mandrel 12 as shown in Fig. 1a, so that the reels 24, 25 are in vertically spaced relation one to the other. This facilitates applying the continuous strips 20 and 21 to the mandrel in the desired sequence, even though both strips 20, 21 are unwound simultaneously from the reels 24, 25 because the shelf 19 permits the determinate length of the continuous flat strip 21, for example, to be laid on the shelf, while the determinate length of the other strip 20 is being applied to the mandrel. When the supply of strip material on a reel is exhausted, another strip is spliced to the end of the first strip using a 45 degree splice and about a 2-inch overlap of the respective ends.

The progressive forming of a continuous flat strip into continuous tubing of determinate length on the mandrel may be accomplished manually and for the particular two ply construction shown in the drawings, the following sequence of method steps may be utilized. The tubular mandrel 12 has its smooth cylindrical outer surface cleaned and lubricated by wiping it with a suitable mold lubricating material such, for example, as silicone oil to prevent objectionable sticking of the formed tubing to the mandrel. A determinate length of each strip 20 and 21 is unwound from the reels 24, 25, and the length of flat strip 21 is laid temporarily upon the support shelf 19, while the length of the flat strip 20 is laid longitudinally along and wrapped circumferentially about the mandrel 12 so that the side margins of the strip 20 are overlapped circumferentially at an upper region of the mandrel and the fill threads of the reinforcing fabric of the strip 20 extend circumferentially about the mandrel to resist circumferential stretching. The overlapped side margins are adhered together as by a suitable synthetic rubber liquid cement, and the outer surface of the formed tubular strip 20 is swabbed with the liquid cement to facilitate adsesively applying the ground wire 23 and the second strip 21 thereto. For increased imperviousness to gasoline and other liquid or gaseous hydrocarbon materials, the strip 20 may be provided with a very thin barrier layer of nylon or other suitable barrier material intermediate the thickness of one of its rubbery composition layers at a face of its reinforcing fabric.

The ground wire 23 is now suitably adhered and disposed longitudinally on the outside of the formed tubular strip 20 at the position of its horizontal diameter and to a side thereof, as shown in Fig. 1a.

The determinate length of the continuous flat strip 21 is next lifted from the shelf 19 and laid longitudinally along and wrapped circumferentially about the formed tubular continuous strip 20 and the ground wire 23 on the mandrel 12. The side margins of the strip 21 are overlapped circumferentially and suitably adhered together along the bottom region of the mandrel diametrically opposite the lapped marginal joint of the strip 20 and the fill threads of the reinforcing fabric of the strip 21 extend circumferentially about the mandrel. This provides a determinate length of tubing or hose of two-ply multistrip construction with diametrically opposite, longitudinally-extending lap joints and with a ground wire 23 between the plies.

The formed tubular assembly of a determinate length of continuous strips 20, 21 and the static-removing wire 23 is wiped with a suitable mold lubricant such as silicone oil so as to prevent sticking of the uncured tubing to the wall of the vulcanizing chamber assembly 13 when the tubing is drawn or pulled into the chamber. It will be noted that the silicone oil treatment of the mandrel itself likewise prevents sticking of the uncured tubing to the mandrel and thereby facilitates advancing such tubing slidably from the mandrel into the vulcanizing chamber assembly wherein is effected vulcanization of the determinate length of uncured tubing.

The vulcanizing chamber assembly 13 includes an elongated tubular molding member 30 having sufficient length to accommodate the determinate length 15 of uncured tubing formed on the mandrel 12, and having a uniform inside diameter corresponding substantially to the desired uniform outside diameter of the tubing to be manufactured. The molding member 30 may be made of suitable stiff metal, desirably stainless steel seamless tubing, with a relatively thin wall for rapidity of heat-transference, but capable of high resistance to distortion under fluid pressures and under elevated temperatures such as within the range of about 200 degrees to about 300 degrees Fahrenheit normally used for vulcanization of rubbery compositions.

An elongated tubular one-piece outer casing or shell 31 of stiff metal such as steel tubing and of substantially greater diameter and wall thickness than the molding member 30 is disposed telescopically and concentrically about such member so as to provide therewith spaced-apart closed annular end cooling jackets or chambers 32, 33 and a closed annular heating-cooling curing jacket or chamber 34 between the end cooling chambers. Continuous annular steel end rings 35, 36 are mounted between the tubular molding member 30 and the outer casing 31 at the ends thereof, and are suitably secured to the member and casing as by welding or brazing, so as to constitute the outer end walls of the end cooling chambers 32, 33. Continuous annular steel partitions 37, 38 suitably secured to the tubular molding member 30 and to the outer casing 31 at positions substantially inwardly spaced from the end rings 35, 36 are provided to separate the heating-cooling curing chamber 34 from the end cooling chambers 32, 33, so that the curing chamber 34 extends desirably throughout the major portion of the length of the concentrically disposed member 30 and casing 31.

An inlet pipe 39 communicates with the heating-cooling curing chamber 34 at one end thereof adjacent the partition 38 and is connected through a suitable two-way control valve 40 to a supply pipe 41 communicating with a source of steam, and also to a supply pipe 42 communicating with a source of cooling water. An exhaust or drain pipe 43 for condensate and cooling water communicates with the heating-cooling curing chamber 34 at the opposite end thereof adjacent the partition 37, as shown in Figs. 1b and 3. For one open setting of the valve 40, steam is permitted to flow into the chamber 34 around and axially along the tubular molding member 30 and then out the exhaust pipe 43, so that the molding member 30 is heated rapidly to the temperature required to vulcanize a determinate length 15 of the uncured tubing within the member 30. For the other open setting of the valve 40, cooling water is permitted to flow into the chamber 34 around the tubular molding member 30 and out the exhaust pipe 43, so that the member 30 is cooled rapidly to the desired temperature for facilitating the movement of an uncured length of tubing into the member 30 and also the movement and removal of the determinate length 15 of tubing in its cured condition from within the member 30. This cooling of the wall of the member 30 at the chamber 34 is important also to permit reducing the time interval between successive steps of advancements of the uncured tubing 15, and to effect some circumferential shrinkage of the cured tubing and to prevent blistering of the materials of the tubing. For the closed setting of the valve 40, neither steam nor cooling water is permitted to flow into the curing chamber 34.

Inlet conduits 44, 45 and one-way control valves 46, 47 connect the end cooling chambers 32, 33 to the source of cooling water to permit cooling water to flow into the chambers 32, 33 around the tubular molding member 30 and out drain conduits 48, 49, so as to maintain the metal wall of the end portions of the molding member 30 at a relatively lower temperature than that at the heating-cooling curing chamber 34 when steam is flowing therein. This arrangement is important to prevent temperatures at the ends of the molding member 30 tending to cause objectionable tackiness of the rubbery material of the uncured tubing 15 at the entrant end 14 of the vulcanizing chamber assembly 13, and also tending to produce an objectionable overcure and blistering of the materials of the end portion of the next adjacent determinate length 15a of cured tubing at the delivery end of the assembly 13.

For inflatably yet mechanically urging and positively pressing and maintaining the continuous annular wall including the lap joints therein of the determinate length 15 of uncured tubing uniformly against the smooth continuous annular uniform diameter inner surface of the molding member 30 in effective heat-conducting and transferring relation therewith, especially throughout the length of the heating-cooling chamber 34, during the curing operation, the invention provides mechanical force or pressure-applying means desirably an elongated inflatable tubular element or diaphragm 50 with closed ends which element is telescopically and concentrically mounted within and extends axially along the tubular molding member 30 preferably approximately coextensive therewith, as shown especially in Fig. 3. The force or pressure-applying elongated tubular element 50 is radially expansible and contractible and may be an elastic extruded tube of heat-resistant rubbery material such, for example, as butyl rubber composition with or without a stretchable textile fabric reinforcement therein, and preferably without such reinforcement.

Butyl rubber is a vulcanizable rubbery polymerization product of isobutylene and a diolefinic compound such, for example, as isoprene or butadiene. The butyl rubber composition is highly impermeable to air and capable of withstanding repetitive applications of inflating fluid and curing temperatures of about 300 degrees Fahrenheit, while maintaining its elasticity without objectionable growth.

The pressure-applying elastic tubular element 50 has in its deflated condition a substantially uniform outside diameter normally slightly less than the internal diameter of the molding member 30 to accommodate slight circumferential shrinkage of the cured tubing during the cooling at the chamber 34 and also to permit, without offering objectionable drag resistance, the passage of the length of uncured tubing 15 between and along the concentrically disposed metal tubular member 30 and elastic tubular element 50 in its uninflated condition and in the direction from the entrant end 14 toward the delivery end 14a of the vulcanizing chamber assembly 13, as shown in Fig. 3. The wall of the elastic tubular element 50 has sufficient strength to resist rupture under internal fluid pressures normally used during the curing operation. Also, it has sufficient elasticity to expand radially and circumferentially to apply mechanical force to the wall of the uncured tubing 15 to urge it positively into intimate contact against the metal wall of the molding member 30, as shown in Fig. 4, and to contract radially and circumferentially so as to permit movement of the wall of the tubing 15 radially away from the molding member, as shown in Fig. 5.

The ends of the elastic tubular element 50 are closed by closure means or structures 51 and 52, one of which being disposed at the entrant end 14 and the other at the delivery end 14a of the assembly 13. The closure means 51 at the entrant end 14 includes a hollow generally cylindrical tube-coupling 53 of suitable steel, for example, having a substantially uniform outside diameter equal to or slightly greater than that of the tubular element 50 but less than the internal diameter of the molding member 30. The tube-coupling 53 has an internally threaded annular outer end portion 54, and an internal radially projecting annular shoulder 55, and a tube-receiving annular inner end or axially-extending flange portion 56 with a plurality of circumferentially-extending, continuous internal serrations arranged for engaging and gripping the tubular element 50, a suitable metal expansion sleeve 57 being provided to positively and securely press and hold the butyl rubber material of the element 50 against the serrations of the flange portion 56.

The closure means 51 also includes a hollow or generally cylindrical mandrel-coupling 58 of suitable steel, for example, having a generally cylindrical outer end or flange portion 59 externally threaded at 59a for threadedly engaging an internally threaded end 60 of the mandrel 12 to support and merge smoothly with the latter, the flange portion 59 having its outer surface inwardly tapered at 61 from the threaded part toward the inner end of the portion 59, so as to junction with the outer cylindrical surface of the tube-coupling 53, as shown especially in Fig. 5. The tapered or conical surface 61 facilitates drawing the uncured tubing 15 from the mandrel 12 through the entrant end 14 of the assembly 13 into the tubular space between the molding member 30 and the pressure-applying tubular element 50, and also facilitates clamping and sealing an end of the length of uncured tubing 15 at the entrant end of the asesmbly 13 during a phase of the curing operation.

The mandrel-coupling 58 at the inner end of its tapered or conical surface 61 has an externally threaded portion 62 engaging the internally threaded portion 54 of the tube-coupling 53 and terminates beyond the portion 62 in a reduced diameter cylindrical inner end portion 63 for mating with and accommodating the annular shoulder 55. The end portion 63 has an annular recess 64 in its outer surface in radial alignment with the annular shoulder 55, so as to receive a continuous annular sealing gasket 65 of circular cross-section and suitable rubbery material, the sealing gasket 65 preventing fluid leakage between the tube-coupling and the mandrel-coupling, and also accommodating relative axial sliding and rotative movement of the tube-coupling 53 and the mandrel-coupling 58 when they are being threaded together.

The mandrel-coupling 58 has an internal bore at 66 of substantially uniform diameter for axially sliding fit with a metal cylindrical plug 67 which has an enlarged, internally threaded, cylindrical end portion 68 seating against the end face of and projecting axially beyond the inner end portion 63 of the mandrel-coupling 58 for receiving and threadedly engaging the external threads of one end portion of a rigid, tubular, fluid-distributing and spacer bar 69 of suitable metal tubing, which tubular bar 69 has a plurality of axially spaced-apart openings or passages 70 in the wall thereof for the passage of pressure fluid into the space of the elastic tubular pressure-applying element 50. The end portion 63 at the bore 66 has an annular recess 71 accommodating therein a suitable annular sealing gasket 72 of circular cross-section and suitable rubbery material for preventing fluid leakage between the plug 67 and the mandrel-coupling 58 and for accommodating relative axial sliding and rotative movement between the mandrel-coupling and the plug when they are being threadedly engaged.

The cylindrical plug 67 at its other end has an externally threaded projecting end portion 73 separably engaging an internally threaded locking sleeve 74 which abuts the other end face 75 of the mandrel-coupling 58, so as to clamp the coupling 58 securely in place on the plug 67 threadedly secured to the tubular spacer bar 69. The locking sleeve 74 desirably projects beyond the outer end of the mandrel-coupling 58 and may terminate in a hexagon shaped end 76 for facilitating manipulation of the locking sleeve 74 to tighten and loosen it on the plug 67.

The cylindrical plug 67 has an axial bore 77 in communication with the tubular fluid-distributing and spacer bar 69 and in communication through a conduit 78 with a source of inflating fluid under pressure such, for example, as compressed air, which fluid can be heated, if desired, to further promote heating the tubing 15. The conduit 78 extends axially and interiorly of and entirely through the tubular mandrel 12 to and beyond its end opposite the vulcanizing chamber asesmbly 13, and may be provided with a suitable control valve 79 adapted to exhaust to the atmosphere and located at such opposite end region, as shown in Fig. 1a. This arrangement facilitates inflating and deflating the pressure-applying element 50 to expand and contract the same.

For forcing fluid under pressure such as compressed air between the tubing 15 and the elastic tubular pressure-applying element 50, after the tubing 15 has been cured and cooled throughout the extent of the chamber 34, so as to separate the walls of the tubing 15 and tubular element 50 from one another, and for supplying a suitable liquid lubricant to the inner face of the wall of the incoming uncured tubing to facilitate the insertion of the incoming uncured tubing and the removal of the cured determinate length of tubing from within the vulcanizing chamber assembly 13, the mandrel-coupling 58 at the junction of its tapered outer surface 61 with the tube-coupling 53 has in such tapered outer surface a relatively deep continuous annular fluid-distributing or manifold groove 80. The manifold groove 80 has communication with a source of fluid under pressure or compressed air and a source of liquid mold lubricant through a conduit 81 of the single passage type as shown, or if desired, of the dual passage type (not shown). The conduit 81 extends from the mandrel-coupling axially and interiorly of and entirely through the tubular mandrel 12 to and beyond its end opposite the vulcanizing chamber assembly, and may have a suitable two-way control valve 82 adapted to exhaust to the atmosphere and connected to inlet conduits 83, 84, respectively, leading from the sources of compressed air and of liquid mold lubricant such, for example, as a water and soap solution which may be under pressure.

It will be noted that for one setting of the valve 82 the compressed air, for example, flows through the conduit 81 and into and circumferentially about the manifold groove 80 so that, when the ends of the determinate length 15 of tubing are sealed at the ends of the vulcanizing chamber assembly 13, the compressed air forces itself circumferentially and axially between the wall of the tubing 15 and the wall of the elastic pressure-applying element 50, thereby compelling separation of such walls throughout their area of contact beyond the groove 80 substantially to an end sealing means 87, 88 at the delivery end 14a of the assembly 13. This facilitates the subsequent introduction and application of the liquid mold lubricant to the wall of the incoming uncured length of tubing 15 for ease of drawing the uncured length of tubing into and the cured length of tubing 15 from within the vulcanizing chamber assembly 13.

The invention provides means for sealing the determinate length 15 of tubing at each end of the assembly 13, which sealing means is preferably of the inflatable type. At the entrant end 14 of the assembly 13, a continuous metal retaining ring 85 having a radially inward facing, continuous annular channel of U-shaped cross-section therein, is secured as by welding to the end ring 35 in alignment therewith, as shown in Figs. 3 and 5. A continuous annular inflatable sealing element 86 is mounted in the channel of the ring 85, which sealing element 86 includes a channeled base 86a of flexible rubber material and a distensible wall 86b of elastic fabric reinforced rubber material extending across the channel of the base and normally disposed in inwardly turned condition in the channel of the base in the uninflated condition of the sealing element, as shown in Fig. 3. The wall 86b is distensible outwardly of the channel of the inflated condition of the sealing element 86, so as to abut sealingly against and clamp the wall of the tubing 15 tightly and conformingly against the tapered or conical surface 61 of the mandrel-coupling 58 in sealing relation thereto, as shown in Fig. 5.

A retaining ring 87 and sealing element 88 assembly similar to the retaining ring 85 and sealing element 86, is similarly secured to the end ring 36 at the delivery end 14a of the vulcanizing chamber assembly 13 to close and seal the tubing 15 at such end. Both sealing elements 86, 88 are desirably inflated and deflated simultaneously, and to this end both sealing elements are in communication with each other and a source of inflating air and the atmosphere through conduits 89, 90, 91 and a suitable inflation control valve 92, as shown in Fig. 1b.

For cooperating with the delivery end sealing element 88, there is provided a metal clamping drum 93 having a cylindrical smooth continuous outer peripheral surface 94 of substantially uniform diameter for supporting and backing the tubing 15. The clamping drum 93 further functions to support the inflatable element 50 assembly within the member 30 and is detachably mounted at the end of the tubular fluid-distributing bar 69 by means of a threaded bolt 95 extending axially into and threadedly engaging a solid metal cylindrically-shaped plug 96 suitably fixedly secured within the end portion 69a of the bar 69, as shown in Fig. 3. The end portion 69a desirably has a smooth, uniform diameter, outer cylindrical surface chromium plated to facilitate relative axial sliding movement thereon of the closure structure 52 secured to the other end of the pressure-applying elastic tubular element 50.

The closure structure 52 includes a metal mounting ring 98 having a uniform bore and having a stepped outer peripheral surface with the larger diameter portion thereof threaded and with the smaller diameter portion thereof grooved to receive a suitable rubber sealing gasket 99, the wall of the bore also having a groove therein for receiving a suitable rubber sealing gasket 100. A tube-coupling 101 similar to the tube-coupling 53 but of opposite hand construction, is threadedly mounted on the mounting ring 98 and is suitably secured to the other end of the pressure-applying element 50, a suitable metal expansion sleeve 102 like the sleeve 57 being utilized to further hold the tube-coupling 101 and element 50 together, as shown in Fig. 3.

It will be noted that substantial axial space is provided initially between the clamping drum 93 and the closure structure 52, so as to permit sliding of the structure 52 axially upon the tubular bar 69 at 69a to accommodate some increase in the initial length of the pressure-applying element 50 due to growth and permanent set of the butyl rubber material thereof as a result of repetitive inflations and applications of heat and cooling. This is important to avoid frequent replacement of the pressure-applying element 50, while at the same time maintaining its effectiveness for holding the tubing 15 in good heat-transferring relation against the wall of the metal molding member 30 during the curing operation.

Since the tubing 15 tends to adhere and stick to the molding member 30 after being heated and cooled, the vulcanizing chamber assembly 13 has provision for breaking the tubing 15 loose from the molding member 30 to facilitate removal of the tubing from within the assembly. To this end each annular partition 37, 38 has a plurality of circumferentially spaced-apart, radially-extending passages 103, 104 therethrough and through the wall of the molding member 30, as shown in Fig. 3. The passages 103, 104 are in communication with a source of fluid under pressure such as compressed air through tubular spider manifolds 105, 106 mounted on the outer casing 31 at the partitions, and through conduits 107, 108 and control valve 109 and conduit 110, as shown in Fig. 1b. The arrangement makes feasible introducing compressed air between the contacting walls of the tubing 15 and the molding member 30 in a manner compelling their separation radially and thus loosen and free the tubing 15 from the molding member for easy removal from the vulcanizing chamber assembly 13 and for facilitating the advancement of the next adjacent length of uncured tubing. The elastic give of the wall of the pressure-applying element 50 makes feasible substantial radial separating movement of the tubing relative to the member 30.

Suitable power-actuated wind-up means may be provided adjacent and spaced from the delivery end 14a of the vulcanizing chamber assembly 13 for drawing the tubing 15 into and through the assembly and for winding the long continuous length of tubing in its cured condition upon a suitable drum or reel 111. The drum is detachably and rotatably mounted on a shaft 112 carried by a suitable vertical standard 113, the shaft 112 and drum 111 being power driven as by a chain and pulley drive mechanism 114 and an electric motor 115 operatively connected therewith. A suitable support shelf 116 may extend from the frame 18 at the delivery end of the assembly 13 to the standard 113 at a position thereon below the drum 111, as shown in Fig. 1b, so as to underlie and prevent the cured length of tubing 15a from contacting the floor 17 which may be dirty, or oily and wet, or otherwise objectionable to the finished tubing, and also to function as a stiff support or brace for the standard 113 to counteract thrust thereon when pulling the cured tubing from within the assembly 13.

In the operation of the vulcanizing chamber assembly 13, the first determinate length 15 of uncured tubing formed on the mandrel 12 may be manually inserted into and drawn through the assembly, but succeeding determinate lengths may be drawn from the mandrel and through the assembly by the power-actuated wind-up means.

For effecting the first or initial insertion, a plurality of thin fabric tape strips (not shown) may be attached as by sewing one end thereof to the end of the first length of tubing adjacent the entrant end 14 of the assembly, the tapes being circumferentially spaced-apart. With the inflatable pressure-applying element 50 and the inflatable end sealing elements 86, 88 uninflated and retracted as shown in Fig. 3, a plurality of suitable wires (not shown) corresponding in number to the tapes are inserted at the delivery end of the assembly into and entirely through the space between the molding member 30 and the pressure-applying element 50 and then each wire is suitably secured to the free end of one of the tapes. The wires are used to pull the tapes manually through the assembly 13, after which the tapes are used to pull and advance the first length of tubing manually through the assembly 13 until an end portion of the tubing 15 is slightly beyond the delivery end of the assembly. Such end portion of the first length of tubing and the tapes and wires are subsequently cut-off before wind-up of the tubing.

For curing and vulcanizing the determinate length 15 of uncured formed tubing within the assembly 13 with both end seals 86, 88 deflated, the force or pressure-applying element 50 is inflated with compressed air at about 90 pounds per square inch pressure, so as to expand and stretch the elastic wall of the element 50 radially outward to exert mechanically suitable molding pressure or force against the wall of the tubing while firmly yet yieldably pressing the wall of the tubing 15 and lap joints thereof into intimate heat-transferring contact and conforming relation against the smooth inner wall of the molding member 30 and while maintaining the interior of the tubing in communication with the atmosphere through the manifold 80, the conduit 81 and the valve 82. To inflate the pressure-applying element 50, the valve 79 is adjusted to its open setting whereby the compressed air flows through the conduit 78, hollow plug 67 and tubular fluid-distributing bar 69 and its passages 70 into the closed interior space of the element 50 and thus produces the desired distention of the element 50, the space between the exterior of the wall of the tubing 15 and the inner surface of the member 30 being in communication with the atmosphere at the end seals 86, 88 in their deflated condition to avoid trapped air between the tubing and the member.

While the pressure-applying element is inflated and mechanically urging the tubing against the molding member 30, heating fluid under pressure such, for example, as steam at about 300° F. is admitted into and passed axially through the heating-cooling chamber 34 to heat the wall of the member 30, and at the same time cooling fluid such, for example, as water is admitted into and passed axially through both end cooling chambers 32, 33, all for a determinate curing period (for example, about 20 minutes) required to vulcanize and integrally unite the rubber and fabric parts of the tubing 15 at the curing zone along the chamber 34 between the end cooling chambers 32, 33. To this end the valve 40 is adjusted to an open setting such that steam from the supply pipe 41 flows through the valve and inlet pipe 39 into the space of the chamber 34 and about and axially along the molding member 30 toward the entrant end 14 of the assembly and out the exhaust pipe 43, whereby the metal wall of the member is uniformly heated rapidly and continuously to the desired vulcanizing temperature, which heating is transmitted through the member 30 to the tubing 15 to vulcanize it. The valves 46, 47 are also adjusted to an open setting whereby cooling water flows through the inlet conduits 44, 45 into and axially along the spaces of both end cooling chambers 32, 33 to and out the drain conduits 48, 49, so as to maintain the end portions of metal wall of the member 30 cool and remove effectively heat conducted through such metal wall from the heated curing zone at the chamber 34, thus preventing objectionable tackiness of the length 15 at the entrant end cooling chamber 32 and objectionable overcure and blistering of the tubing 15 at the delivery end cooling chamber 33.

When the determinate curing period is ended and while the member 50 is still inflated to urge the tubing mechanically against the molding member, the valve 40 is adjusted to a second open setting, so as to shut off the steam and to permit cooling water to flow through the supply pipe 42 and inlet pipe 39 into the chamber 34 and out the exhaust pipe 43, thus rapidly and uniformly cooling the cured length 15 of tubing throughout the extent of the chamber 34 to produce limited circumferential shrinkage of the tubing 15 and to stop the cure and prevent blistering of the tubing. This cooling is advantageous to reduce the total time of the interval of rest of the tubing 15 within the assembly 13 and contributes materially to manufacturing vulcanized, blister-free tubing on a production basis.

It is to be noted that while the tubing 15 within the assembly 13 is being heated, cooled and cured during its interval of rest therein, the next adjacent and successive determinate length of tubing may be manually formed upon the mandrel 12, from the continuous strips 20, 21, in the manner described hereinabove.

After the cured length 15 of tubing has been sufficiently cooled, the pressure-applying element 50 is deflated to eliminate the mechanical molding force exerted by the element and to permit the elastic retraction of its wall, and the sealing elements 86, 88 are then inflated to clamp and seal the tubing 15 against the mandrel-coupling 58 and the drum 93 at the respective ends of the assembly 13. The pressure-applying element 50 is deflated by adjusting the valve 79 to its closed setting, so as to shut off the compressed air supply and to permit the air within the element 50 to exhaust through the fluid-distributing bar 69, plug 67 and conduit 78 to the atmosphere. The end sealing elements 86, 88 are inflated by adjusting the valve 92 to its open setting, so as to admit compressed air through the conduits 89, 90 and 91 simultaneously to the sealing elements, thereby distending their distensible walls outwardly of the channeled bases and against the tubing 15 to clamp it tightly against the mandrel-coupling conical surface 61 and the drum surface 94 in sealing relation thereto.

The next method step is to separate and loosen the wall of the pressure-applying element 50 from the wall of the cured tubing 15, and this is accomplished by introducing compressed air, for example, between such walls beginning at the entrant end 14 of the assembly 13 through adjustment of the valve 82 to an open setting. This permits the compressed air to flow through inlet conduit 83 and conduit 81 to and circumferentially about the manifold groove 80 in the mandrel-coupling 58 and then to force itself axially along and circumferentially between the wall of the cured tubing 15 and the wall of the pressure-applying element 50 in its deflated condition throughout the extent of the element 50. The valve 82 is desirably adjusted to and from such open setting several times to alternately admit and exhaust the compressed air to provide a pulsating effect of the compressed air upon the walls of the cured tubing 15 and the element 50 so as to further assure full separation and loosening of such walls throughout the extent of the element 50.

With the valve 82 now closed, the sealing elements 86, 88 are deflated by appropriate adjustment of the valve 92 thus breaking the end seals to open the space between the loosened pressure-applying element 50 and the groove 80 and the tubing 15 to the atmosphere, especially through the conduit 81 and the valve 82 in its exhaust setting.

Then the sealing elements 86, 88 are again inflated to seal the ends of the length 15 of cured tubing, after which the wall of the tubing is compelled to separate and move radially away from the wall of the molding member 30. This is accomplished by adjusting valve 109 to its open setting to admit compressed air under approximately 10 pounds pressure through the conduits 107, 108, 110 and the spider manifolds 105, 106 to and through the passages 103, 104 in the partitions 37, 38, so as to inflatably force and move the wall of the cured tubing 15 radially away from the molding member 30, the elastic give of the wall of the elastic tubular element 50 facilitating such movement of the tubing. The valve 109 is desirably adjusted several times to and from its open setting to provide a pulsating effect of the compressed air upon the tubing 15 to assure full separation thereof from the molding member 30 between the end seals, after which the sealing elements 86, 88 are deflated to free the tubing for axial advancement.

The next method step is to force liquid mold lubricant under about 10 pounds pressure to flow from the manifold groove 80 so as to lubricate the inside surface of the wall of the uncured tubing 15 as it is drawn off the mandrel 12 into the vulcanizing chamber assembly 13. This is done by adjustment of the valve 82 to its second opening setting so that the mold lubricant flows through the inlet conduit 84 and conduit 81 to the manifold groove 80 and then sprays upon the moving wall of the uncured tubing 15. While the liquid lubricant is being supplied, the determinate length 15a of cured tubing is drawn axially from within the vulcanizing chamber assembly 13 thus advancing the next adjacent and succeeding determinate length 15 of uncured tubing from the mandrel 12 into the assembly 13 to a position therein such that only a very short end portion of the length 15a of cured tubing is subject to reduced heating and additional cure at the region of the delivery end partition 38. This assures continuity of cure between succeeding determinate lengths of tubing without objectionable overcure at the adjoining end portions thereof.

When the determinate length 15a of cured tubing is the first length, it may be withdrawn manually from within the assembly 13, and several turns wound upon the reel 111. The reel 111 may be power driven to wind-up the remainder of the first length of tubing, while advancing the next adjacent determinate length 15 of uncured tubing from the mandrel 12 into and through the assembly 13. All succeeding lengths of uncured tubing may be similarly advanced by operation of the wind-up means and in a step by step manner.

The foregoing method steps are repeated as often as desired. This produces a long continuous length of tubing or hose of rubbery vulcanizable material by forming continuous normally flat strip material into successive determinate lengths of tubing upon a mandrel; by advancing the determinate lengths of tubing through an elongated vulcanizing chamber assembly by step-by-step movement; by applying heat and then cooling to the tubing during its intervals of rest within the assembly while exerting radially outward mechanical molding force directly on the tubing through an inflatable tubular element so as to vulcanize and cure each determinate length of tubing during its interval of rest within the assembly; by applying fluid under pressure to the interior and exterior surfaces of the wall of the tubing within the assembly to separate the tubing from adjacent parts of the assembly; and by drawing each cured length of tubing from within the assembly, while advancing the next adjacent length of uncured tubing into the assembly to a determinate position therein and at the same time applying a lubricant to the interior surface of uncured tubing during its advancement from the mandrel.

The particular two-ply tubing or hose as described and as produced by the hereinabove described method steps and apparatus, is impervious to liquids and gases, highly flexible and lightweight consistent with strength requirements, and is highly suited for the transportation of gasoline, for example, between widely spaced points and over rough terrain as in military service, when permanent metal pipelines are not available or are out of commission.

Variations may be made without departing from the scope of the invention as it is defined in the following claims.

We claim:

1. The method of manufacturing a continuous length of tubing of vulcanizable rubbery material, which method comprises the steps of forming a continuous strip of uncured rubbery sheet material progressively into a continuous length of uncured tubing having a plurality of determinate lengths thereof in succession, providing an elongated tubular molding member of a length substantially equal to that of a determinate length of uncured tubing, advancing the determinate lengths of uncured tubing through said molding member by a step-by-step movement, curing each determinate length of uncured tubing during its interval of rest in the molding member by pressing the wall of the uncured tubing radially outward into contacting heat-transferring relation with the adjacent wall of the molding member and at the same time maintaining the interior space of the uncured tubing in communication with the outer atmosphere through the end of the uncured tubing at the entrant end of the molding member and by heating said adjacent wall of the molding member a determinate period of time to cure the tubing therein, sealing opposite end portions of the wall of the cured tubing in said molding member relative to said wall of such member at its entrant and delivery ends while such walls contact one another therebetween, and moving the wall of the cured tubing in the molding member radially inward away from contact against said adjacent wall of such member while said end portions of the cured tubing are sealed by subjecting the exterior of said wall of said cured tubing intermediate its sealed end portions to fluid under pressure to compel separation of the contacting walls of the cured tubing and the molding member to facilitate advancing the succeeding length of uncured tubing into the member.

2. The method of manufacturing a continuous length of tubing of vulcanizable rubbery material, which method comprises the steps of forming a continuous strip of uncured rubbery sheet material progressively into a continuous length of uncured tubing having a plurality of determinate lengths thereof in succession, providing an elongated tubular molding member of a length substantially equal to that of a determinate length of uncured tubing, successively advancing the determinate lengths of uncured tubing into said molding member, curing the uncured tubing while in the molding member with the entrant and the delivery ends of said member open to the outer atmosphere by mechanically pressing the wall of the uncured tubing radially outward against the adjacent wall of the molding member in heat-transferring relation thereto substantially from its entrant end to its delivery end and at the same time maintaining the interior space of the uncured tubing within said molding member in communication with the outer atmosphere through the end of the uncured tubing at the entrant end of the molding member and by heating said wall of the molding member along a curing zone thereof terminating short of said entrant end and said delivery end, cooling the end portion of the uncured tubing at said entrant end beyond said curing zone and also the end portion of the adjacent length of previously cured tubing at said delivery end beyond said curing zone by cooling the end portions of said adjacent wall of the molding member beyond said curing zone thereof during the curing operation, cooling the wall of the cured tubing in the molding member by cooling said wall of such member at said curing zone thereof subsequent to each said heating of said wall thereof, and sealing said end portions of the tubing in the molding member relative to said wall of said member at its entrant and delivery ends while exerting radially inward fluid-pressure force circumferentially against the exterior of said wall of the cured tubing in the molding member throughout said curing zone thereof to separate the walls of the cured tubing and the molding member to facilitate advancing the next length of uncured tubing into the member.

3. A vulcanizing chamber assembly for curing a continuous length of uncured tubing of vulcanizable rubbery material, said vulcanizing chamber assembly comprising an elongated tubular molding member of uniform bore throughout and concentrically mounted within and radially spaced from and connected to an elongated tubular outer casing in a manner to provide therewith opposite end cooling jackets and a heating jacket therebetween surrounding said molding member, said member being open at its entrant and delivery ends for receiving successive determinate lengths of uncured tubing advanced by step-by-step movement through the molding member, an elongated tubular pressure-applying inflatable element of a length approximately equal to that of said molding member mounted in axially fixed relation to and concentrically within such member for positioning within the uncured tubing and said element having a continuous annular wall of elastic rubbery material resistant to heat with an outside diameter less than the inside diameter of said molding member, closure means secured to the elastic wall of said inflatable element at the ends thereof to seal and close the same, means in communication through one of said closure means with the interior space of said inflatable element for admitting and exhausting an inflating medium to and from said space to expand radially and contract radially said elastic wall of said inflatable element whereby said inflatable element upon inflation is operative to contact and mechanically press the wall of the uncured tubing radially outward against the adjacent wall of said molding member in heat-transferring relation thereto along all said jackets during the interval of rest of the uncured tubing in said member and passage means in the said one closure means for communication with the interior space of the uncured tubing within said molding member and for communication with the outer atmosphere at the entrant end of the assembly, means in communication with said heating jacket for circulating heating fluid about the wall of said molding member at said heating jacket during the interval of rest of the uncured tubing to vulcanize the latter, and means in communication with said end cooling jackets for circulating cooling fluid about the wall of said molding member at said cooling jackets during said interval of rest of the uncured tubing.

4. A vulcanizing chamber assembly comprising an elongated tubular molding member of substantially uniform inside diameter open at its entrant and delivery ends for receiving successive determinate lengths of uncured tubing of vulcanizable rubbery material advanced by step-by-step movement through the molding member, inflatable pressure-apply means within said molding member for positioning within the uncured tubing and operative to press the wall of the uncured tubing radially outward against the adjacent wall of said molding member in heat-transferring relation thereto during the interval of rest of the uncured tubing in said member, said pressure-applying means comprising an elongated tubular open-ended inflatable element extending from said entrant end and terminating short of said delivery end of the molding member and having in the uninflated condition a substantially uniform outside diameter less than the inside diameter of said member to accommodate said movement of the uncured tubing, said inflatable element having a continuous annular circumferentially expansible and contractible wall of elastic material subject to axial growth under repetitive inflations and heating, a coupling closure structure mounted within said molding member at said entrant end thereof in axially fixed relation thereto and sealingly secured to the adjacent open end of said inflatable element to close the same, said structure having an outer peripheral surface of a diameter less than the inside diameter of said molding member for disposition within the uncured tubing and having a passage in communication with said peripheral surface and the outer atmosphere for venting the interior of the uncured tubing to the outer atmosphere, a spacer bar secured to said structure and extending axially therefrom centrally within said inflatable element to a position spaced axially beyond the other open end of the inflatable element and having stop means thereon at said position, and a second coupling closure structure mounted within said molding member at said delivery end thereof and sealingly secured to said other open end of said inflatable element and mounted on said spacer bar for axial sliding movement thereon toward said stop means to accommodate said axial growth of the inflatable element, and means operative to heat the wall of said molding member during said interval of rest of the uncured tubing to vulcanize the tubing in said molding member.

5. Apparatus for manufacturing a continuous length of tubing of vulcanizable rubbery material, said apparatus comprising an elongated tubular mandrel of a length to permit forming thereon a determinate length of uncured tubing from a continuous strip of vulcanizable rubbery sheet material and a vulcanizing chamber assembly at an end of said mandrel, said assembly including an elongated tubular molding member in axial alignment with said mandrel and open at both ends and having an inside diameter greater than the outside diameter of said mandrel for receiving successive determinate lengths of uncured tubing advanced from said mandrel, said assembly including inflatable pressure-applying means within said molding member for positioning within the uncured tubing, said means comprising an inflatable tube of less outside diameter than the inside diameter of said molding member extending from the entrant end of said member and terminating in a closed end substantially at the delivery end thereof, and a mandrel and tube-coupling structure in the entrant end of said member interconnecting and secured sealingly to said end of the mandrel and to the other end of said inflatable tube, said structure having an outer peripheral surface with a peripheral manifold groove therein and having passages in communication with the interior of said inflatable tube and with said manifold groove, means including conduits connected to said passages and extending through said mandrel toward the other end thereof for supplying fluid under pressure through said passages to said inflatable tube and to said manifold groove and for communication of said inflatable tube and said manifold groove with the outer atmosphere, means for heating the wall of said molding member to cure the tubing therein, and power-actuated means adjacent the delivery end of said assembly to pull the cured tubing through said molding member while advancing the succeeding length of uncured tubing from the mandrel into said molding member.

6. The method of manufacturing a continuous length of vulcanizable rubbery material which method comprises providing a continuous length of uncured tubing having a plurality of determinate lengths thereof in succession, providing an elongated tubular molding member of a length substantially equal to that of a determinate length of uncured tubing and a radially extensible-retractable element mounted in axially fixed relation to and within said molding member and extending axially substantially coextensive therewith, advancing the determinate lengths of uncured tubing through said molding member and telescopically about and along said element by a step-by-step movement, heating each determinate length of uncured tubing during its interval of rest in the molding member by extending said element radially outward to and against the wall of the uncured tubing thereby mechanically pressing the wall of the uncured tubing radially outward against the adjacent wall of the molding member in heat-transferring relation thereto and at the same time maintaining the interior space of the uncured tubing within said molding member in communication with the outer atmosphere through the tubing at the entrant end only of the molding member and by applying heating fluid directly to said wall of the molding member a determinate period of time to cure the length of tubing therein, cooling the wall of the cured tubing within said molding member by cooling said adjacent wall of the molding member subsequent to each heating operation, retracting said element radially inward thereby ending its mechanical pressure against the wall of the cured length of tubing within the molding member and subsequently moving the wall of said cured length of tubing radially outward away from said element into separated relation thereto by subjecting the interior of said cured length of tubing to fluid under pressure admitted thereto in a pulsating manner, sealing each end of said cured length of tubing within the molding member relative to the adjacent wall of said molding member and then exerting radially inward force circumferentially against the exterior of said wall of said cured length of tubing by admitting fluid under pressure through said adjacent wall of the molding member at a position intermediate the ends of the molding member to separate said walls and facilitate advancing the succeeding length of uncured tubing into the molding member and about said element.

7. The method of manufacturing a continuous length of tubing of vulcanizable rubbery material, which method comprises the steps of successively advancing determinate lengths of uncured tubing into an elongated molding member and concentrically about and along an elongated inflatable tubular element positioned in axially fixed relation to and within said molding member and extending axially substantially coextensive therewith, heating the uncured tubing while in the molding member by inflatably distending said element thus moving the wall thereof radially outward to and against the wall of the uncured tubing thereby mechanically pressing the wall of the uncured tubing radially outward against the adjacent wall of the molding member in heat-transferring relation thereto and at the same time maintaining the interior space of the tubing within said molding member in communication with the atmosphere at one end only of the molding member and by applying heating fluid directly to said wall of the molding member, cooling the end portion of the uncured tubing at the entrant end of said molding member and also cooling the end portion of the adjacent length of previously cured tubing at the delivery end of said molding member during said heating of the uncured tubing, retracting said wall of said inflatable tubular element radially inward by deflating the latter element thereby ending its mechanical pressure against the cured length of tubing within the molding member and subsequently moving the wall of such cured length of tubing radially outward away from said element into separated relation thereto, and admitting a lubricant to the interior of the tubing at the entrant end of said molding member while advancing the succeeding length of uncured tubing into the molding member and concentrically about said inflatable tubular element.

8. The method of manufacturing a continuous length of tubing of vulcanizable rubbery material, which method comprises the steps of forming a continuous length of uncured tubing having a plurality of determinate lengths thereof in succession, providing an elongated tubular molding member of a length substantially equal to that of a determinate length of uncured tubing and an elongated inflatable tubular element positioned in axially fixed relation to and within said molding member and extending axially substantially coextensive therewith, advancing the determinate lengths of uncured tubing through said molding member and telescopically about and along said inflatable tubular element by a step-by-step movement, heating each determinate length of uncured tubing during its interval of rest in the molding member by inflatably distending said element thus moving the wall thereof radially outward to and against the wall of the uncured tubing thereby mechanically pressing said wall of the uncured tubing radially outward against the adjacent wall of the molding member in heat-transferring relation thereto and at the same time maintaining the interior space of the uncured tubing within said molding member in communication with the outer atmosphere through the tubing at the entrant end only of said molding member and by applying heating fluid directly to said wall of the molding member, cooling the wall of the cured tubing within said molding member by cooling said adjacent wall of the molding member including opposite end portions thereof subsequent to each such heating operation, retracting said wall of said inflatable tubular element radially inward by deflating said element thereby ending its mechanical pressure against the wall of the cured length of tubing within the molding member, sealing both ends of said cured length of tubing relative to the deflated tubular element and admitting air under pressure in a pulsating manner to the interior of the said cured length of tubing at a position inwardly of one of its sealed ends thereby moving the wall of said cured length of tubing radially outward away from the deflated tubular element into separated relation thereto, and exerting radially inward force circumferentially against the exterior of said wall of the cured tubing within the molding member by admitting air under pressure through said wall of the molding member at a position therein intermediate the sealed ends of the cured length of tubing to separate the wall of the cured length of tubing from the wall of the molding member and subsequently breaking the seat at said ends of the cured length of tubing in the molding member to facilitate advancing the next length of uncured tubing into said molding member and about said element.

References Cited in the file of this patent

UNITED STATES PATENTS

| | | |
|---|---|---|
| 1,168,390 | Goldsmith | Jan. 18, 1916 |
| 1,455,240 | Cobb | May 15, 1923 |
| 1,754,502 | Denmire | Apr. 15, 1930 |
| 1,871,364 | Gibbons | Aug. 9, 1932 |
| 2,210,000 | Peel | Aug. 6, 1940 |
| 2,320,564 | Brooks | June 1, 1943 |